US009561733B2

(12) United States Patent
Maeno

(10) Patent No.: US 9,561,733 B2
(45) Date of Patent: Feb. 7, 2017

(54) ON-VEHICLE TRAVEL DISTANCE OUTPUT APPARATUS

(71) Applicant: Seigen Maeno, Toyota (JP)

(72) Inventor: Seigen Maeno, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/761,237

(22) PCT Filed: Jan. 25, 2013

(86) PCT No.: PCT/JP2013/051612
§ 371 (c)(1),
(2) Date: Jul. 15, 2015

(87) PCT Pub. No.: WO2014/115308
PCT Pub. Date: Jul. 31, 2014

(65) Prior Publication Data
US 2015/0367746 A1 Dec. 24, 2015

(51) Int. Cl.
*B60K 6/22* (2007.10)
*B60K 35/00* (2006.01)
(Continued)

(52) U.S. Cl.
CPC ............ *B60L 11/1861* (2013.01); *B60K 6/22* (2013.01); *B60K 35/00* (2013.01); *B60L 1/003* (2013.01); *B60L 3/00* (2013.01); *B60L 3/12* (2013.01); *B60L 7/14* (2013.01); *B60L 8/00* (2013.01); *B60L 8/003* (2013.01); *B60L 11/126* (2013.01); *B60L 11/14* (2013.01); *B60L 11/18* (2013.01);
(Continued)

(58) Field of Classification Search
None
See application file for complete search history.

(56) References Cited

U.S. PATENT DOCUMENTS

2012/0075090 A1 3/2012 Satake et al.
2012/0280804 A1 11/2012 Matsumoto et al.

FOREIGN PATENT DOCUMENTS

CN 102050000 A 5/2011
CN 102416879 A 4/2012
(Continued)

OTHER PUBLICATIONS

International Search Report issued Mar. 12, 2013, in PCT/JP2013/051612, filed Jan. 25, 2013.

Primary Examiner — Mussa A Shaawat
Assistant Examiner — Abdhesh Jha
(74) Attorney, Agent, or Firm — Oblon, McClelland, Maier & Neustadt, L.L.P.

(57) ABSTRACT

An on-vehicle travel distance output apparatus for a vehicle is disclosed. The vehicle including a battery and a travel motor that generate, based on electric power of the battery, a drive force for the travel of the vehicle, wherein the battery is chargeable based on electric power from a first charge source as well as electric power from a second charge source. The on-vehicle travel distance output apparatus includes a processing device that calculates a first travel distance of the vehicle over which the vehicle travels based on the electric power of the battery obtained from the first charge source and a second travel distance of the vehicle over which the vehicle travels based on the electric power of the battery obtained from the second charge source to output the calculated first and second travel distances.

7 Claims, 5 Drawing Sheets

(51) Int. Cl.

| | |
|---|---|
| *B60L 3/00* | (2006.01) |
| *B60L 8/00* | (2006.01) |
| *B60L 11/18* | (2006.01) |
| *B60L 7/14* | (2006.01) |
| *B60L 11/12* | (2006.01) |
| *B60L 11/14* | (2006.01) |
| *B60L 1/00* | (2006.01) |
| *B60L 3/12* | (2006.01) |
| *B60L 15/20* | (2006.01) |

(52) U.S. Cl.
CPC ........ *B60L 11/1816* (2013.01); *B60L 11/1868* (2013.01); *B60L 15/2009* (2013.01); *B60K 2350/1092* (2013.01); *B60L 2210/12* (2013.01); *B60L 2210/14* (2013.01); *B60L 2210/40* (2013.01); *B60L 2220/14* (2013.01); *B60L 2240/34* (2013.01); *B60L 2240/423* (2013.01); *B60L 2240/547* (2013.01); *B60L 2240/549* (2013.01); *B60L 2250/16* (2013.01); *B60L 2260/52* (2013.01); *B60L 2260/54* (2013.01); *Y02T 10/6217* (2013.01); *Y02T 10/645* (2013.01); *Y02T 10/7005* (2013.01); *Y02T 10/7044* (2013.01); *Y02T 10/7066* (2013.01); *Y02T 10/7072* (2013.01); *Y02T 10/7077* (2013.01); *Y02T 10/7083* (2013.01); *Y02T 10/7225* (2013.01); *Y02T 10/7233* (2013.01); *Y02T 10/7241* (2013.01); *Y02T 10/7275* (2013.01); *Y02T 90/127* (2013.01); *Y02T 90/14* (2013.01)

(56) References Cited

FOREIGN PATENT DOCUMENTS

| | | |
|---|---|---|
| DE | 102008035460 A1 | 5/2009 |
| DE | 102011116313 A1 | 4/2013 |
| JP | 2004 208451 | 7/2004 |
| JP | 2006 139114 | 6/2006 |
| JP | 2012-071637 A | 4/2012 |

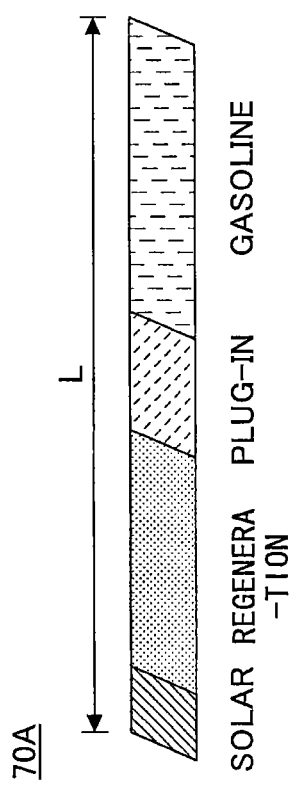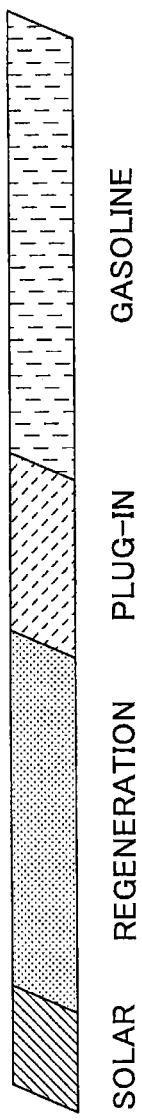

ON-VEHICLE TRAVEL DISTANCE OUTPUT APPARATUS

TECHNICAL FIELD

The disclosure is related to an on-vehicle travel distance output apparatus.

BACKGROUND ART

A charge display device is known which includes a charged-amount display part that displays a battery charge amount of a battery according to assorted kinds of charge sources when the battery is charged by a plurality of the charge sources (see Patent Document 1, for example).

[Patent Document 1] Japanese Patent Application Publication No. 2012-071637

DISCLOSURE OF INVENTION

Problem to be Solved by Invention

However, according to a configuration disclosed in Patent Document 1, there is a problem that users cannot recognize how the respective charge sources contribute to the travel of the vehicle because the users can see only the respective battery charge amounts from the charge sources in the current state of charge of the battery.

Therefore, an object of the disclosure is to provide an on-vehicle travel distance output apparatus that can represent how two or more charge sources each contribute to the travel of a vehicle.

Means to Solve the Problem

According to an aspect of the disclosure, an on-vehicle travel distance output apparatus is provided, the vehicle including a battery and a travel motor that generate, based on electric power of the battery, a drive force for the travel of the vehicle, wherein the battery is chargeable based on electric power from a first charge source as well as electric power from a second charge source, the on-vehicle travel distance output apparatus includes:

a processing device that calculates a first travel distance of the vehicle over which the vehicle travels based on the electric power of the battery obtained from the first charge source and a second travel distance of the vehicle over which the vehicle travels based on the electric power of the battery obtained from the second charge source to output the calculated first and second travel distances.

Advantage of the Invention

According to the disclosure, an on-vehicle travel distance output apparatus is obtained that can represent how two or more charge sources each contribute to the travel of a vehicle.

BRIEF DESCRIPTION OF DRAWINGS

FIGS. 3A, 3B, and 3C are diagrams for schematically illustrating examples of a charge source-specific travel distance image displayed on a display 20.

BEST MODE FOR CARRYING OUT THE INVENTION

In the following, embodiments are described in detail with reference to appended drawings.

Figure 1:
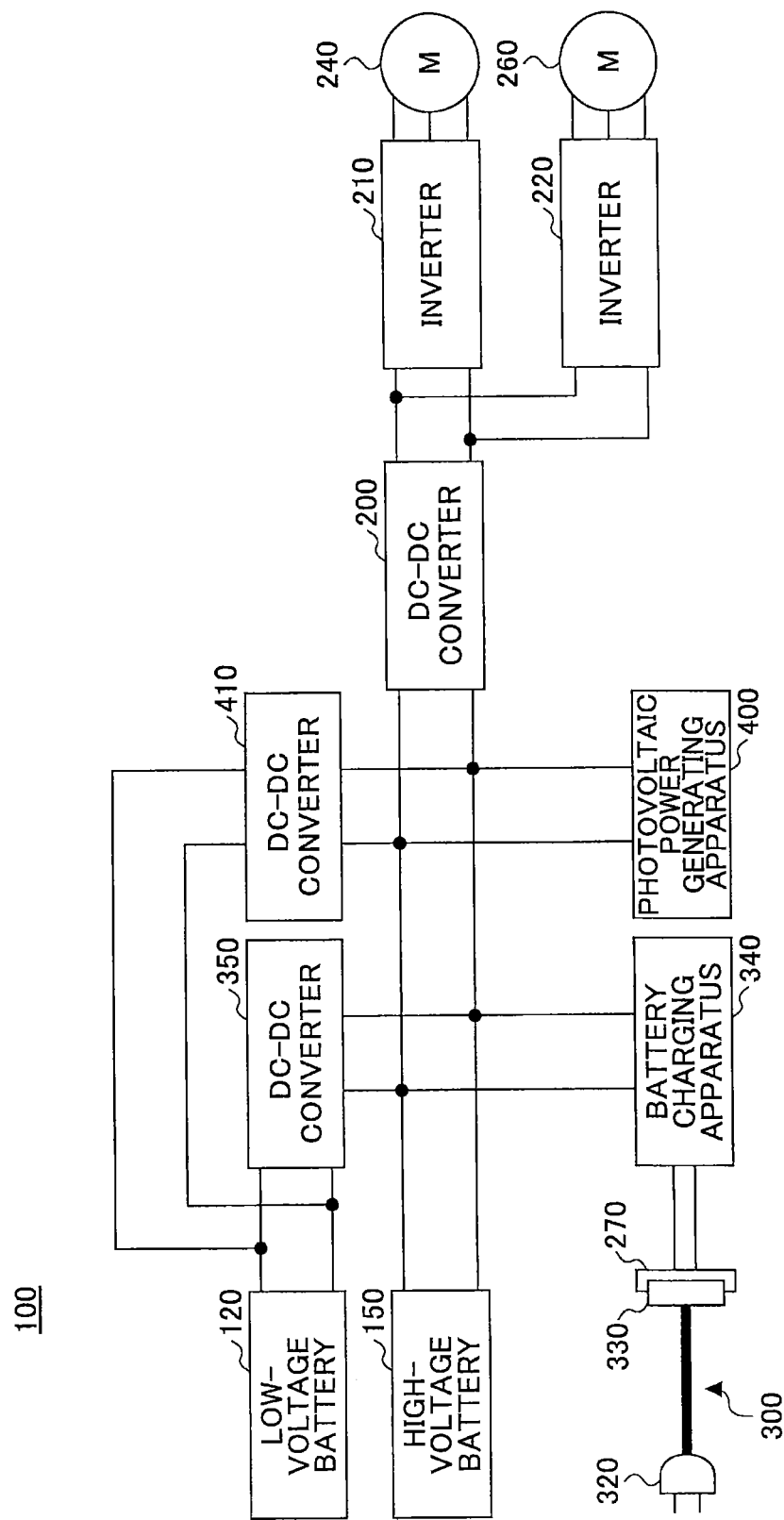
FIG. 1 is a diagram for illustrating an example of an overview configuration of a motor drive system 100 for an electric vehicle.

FIG. 1 is a diagram illustrating an example of an overview configuration of a motor drive system 100 for an electric vehicle. The motor drive system 100 is a system for driving a drive motor 240 for driving a vehicle using electric power (energy) from a high-voltage battery 150. It is noted that a type of the electric vehicle or a detailed configuration of the electric vehicle may be arbitrary as long as the electric vehicle is driven with the drive motor 240 using electric power. Typically, the electric vehicle includes a hybrid vehicle (HV) which uses an internal combustion engine and the drive motor 240 as a power source and a genuine electric vehicle which uses the drive motor 240 only as a power source. It is noted that details of a power train of the hybrid vehicle are arbitrary. For example, a hybrid system of a series type, a parallel type, a split type using a planet gear mechanism, etc., may be used.

The motor drive system 100 includes a low-voltage battery 120, the high-voltage battery 150, a DC-DC converter 200, inverters 210 and 220, the drive motor 240 and an electric power generating motor 260 for generating electric power, as illustrated in FIG. 1.

The low-voltage battery 120 may have a rating voltage of 12 V, for example. The low-voltage battery 120 is connected to various on-vehicle electric loads, such as an air conditioner, an audio apparatus, etc.

The high-voltage battery 150 is an arbitrary capacitor cell which accumulates power to output a direct-current voltage. The high-voltage battery 150 may be configured as a nickel hydrogen battery, a lithium ion battery or a capacitive element such as an electrical double layer capacitor, etc. It is noted that the high-voltage battery 150 may be a battery pack (battery stack) that is configured by stacking a plurality of single batteries.

The DC-DC converter 200 may be a bidirectional DC-DC converter (a reversible chopper type DC-DC converter). The DC/DC converter 200 may be capable of performing a step-up conversion of 200 V to 650 V, and a step-down conversion of 650 V to 200 V, for example.

The inverter 210 includes arms of U-V-W phases disposed in parallel between the positive side lines and the negative side line of the high-voltage battery 150. The inverter 220 includes arms of U-V-W phases disposed in parallel between the positive side lines and the negative side line. The inverters 210 and 220 are disposed in parallel between the positive side lines and the negative side line.

The drive motor 240 may be of any type. For example, the drive motor 240 may be a permanent magnet type of a synchronous motor generator that includes a rotor and a stator around which three-phases coils are wound. In this case, the drive motor 240 may be of an IPM (Interior Permanent Magnet) type in which a permanent magnet is embedded in a rotor thereof, or may be of a SPM (Surface Permanent Magnet) type in which a permanent magnet is provided on a surface of rotor. In this way, details of the drive motor 240 are arbitrary.

The electric power generating motor 260 may have the same mechanical configuration as the drive motor 240. However, the electric power generating motor 260 may a function of a generator that performs only the electric power generation, or have a function of a motor that generates the drive force to be transmitted to wheels of the vehicle, in addition to the function of the generator. For example, in the case of the hybrid system of a split type, the electric power generating motor 260 generates the electric power in the decelerated state of the vehicle by rotating in a traveling direction while generating negative torque to perform a regenerative brake operation. The electric power generated by the electric power generating motor 260 may be used for charging the high-voltage battery 150 that becomes an electric power source for the drive motor 240, or used as the electric power source for the drive motor 240.

The example illustrated in FIG. 1 is related to a so-called plug-in hybrid vehicle in which the low-voltage battery 120 and the high-voltage battery 150 are chargeable from external electric power sources. It is noted that only the high-voltage battery 150, among the low-voltage battery 120 and the high-voltage battery 150, may be chargeable from the external electric power sources. In the example illustrated in FIG. 1, the low-voltage battery 120 and the high-voltage battery 150 are connectable to the external electric power sources (an AC power source intended for the home, or electric power sources of charge facilities) via a charge cable 300 and a charging apparatus 340. The charging apparatus 340 is connected to the low-voltage battery 120 via a DC-DC converter 350 for a step-down conversion, as illustrated in FIG. 1. The charging apparatus 340 converts the AC power supplied from the external electric power sources via the charge cable 300 into DC power. The charge cable 300 includes a plug 320 that is to be connected to the external electric power sources, and a connector 330 that is to be connected to an inlet of the vehicle. The inlet 270 is provided at the vehicle and is connected to the charging apparatus 340. It is noted that how to allocate the power obtained from the external electric power sources to the low-voltage battery 120 and the high-voltage battery 150 is arbitrary; however, it may be adjusted according to the respective states of charge of the low-voltage battery 120 and the high-voltage battery 150, for example.

The example illustrated in FIG. 1 includes a photovoltaic power generating apparatus 400 that is chargeable from energy of sunlight. The configuration of the photovoltaic power generating apparatus 400 may be arbitrary. For example, the photovoltaic power generating apparatus 400 may include solar panels provided on a roof of the vehicle. The low-voltage battery 120 and the high-voltage battery 150 are connected the photovoltaic power generating apparatus 400. The low-voltage battery 120 and the high-voltage battery 150 may be chargeable by the electric power generated by the photovoltaic power generating apparatus 400. It is noted that, in the example illustrated in FIG. 1, the charging apparatus 340 is connected to the low-voltage battery 120 via the DC-DC converter 350 for the voltage conversion, as illustrated in FIG. 1. It is noted that, similarly, the photovoltaic power generating apparatus 400 may be connected to the high-voltage battery 150 via a DC-DC converter for the voltage conversion. It is noted that only the high-voltage battery 150, among the low-voltage battery 120 and the high-voltage battery 150, may be chargeable from the photovoltaic power generating apparatus 400.

The way of generating the electric power with the photovoltaic power generating apparatus 400, and the way of charging the low-voltage battery 120 and the high-voltage battery 150 with the electric power generated by the photovoltaic power generating apparatus 400 may be arbitrary. For example, the power generation by the photovoltaic power generating apparatus 400 may be constantly performed during an ON state of an ignition switch, or may be performed only when a predetermined solar irradiation amount is obtained. Further, the power generation by the photovoltaic power generating apparatus 400 may be performed while the vehicle is parked (i.e., during an OFF state of the ignition switch). Further, how to allocate the power obtained from the photovoltaic power generating apparatus 400 to the low-voltage battery 120 and the high-voltage battery 150 may be adjusted according to the respective states of charge of the low-voltage battery 120 and the high-voltage battery 150.

Figure 2:
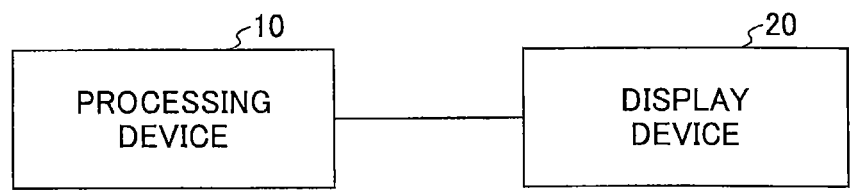
FIG. 2 is a diagram for illustrating a schematic configuration of an on-vehicle travel distance output apparatus 1.

FIG. 2 is a diagram for illustrating a main configuration of the on-vehicle travel distance output apparatus 1. The on-vehicle travel distance output apparatus 1 is installed on the vehicle. The on-vehicle travel distance output apparatus 1 includes a processing device 10.

The processing device 10 may be configured with a processor including a CPU. The respective functions of the processing device 10 (including functions described hereinafter) may be implemented by any hardware, any software, any firmware or any combination thereof. For example, any part of or all the functions of the processing device 10 may be implemented by an ASIC (application-specific integrated circuit), a FPGA (Field Programmable Gate Array) or a DSP (digital signal processor). Further, the processing device 10 may be implemented by a plurality of processing devices (a plurality of ECUs, for example).

The processing device 10 is connected to a display 20. It is noted that the connection between the processing device 10 and the display 20 may be a wired connection or a wireless connection, and may be a direct connection or an indirect connection. Further, a part or all of the functions of the processing device 10 may be implemented by a processing device (not illustrated) which may be installed in the display 20.

The display 20 may be an arbitrary display device such as a meter, a liquid crystal display and a HUD (Head-Up Display). The display 20 may be placed at an appropriate location in the vehicle (at the lower side of the center portion of an instrument panel, for example). Further, the display 20 may be a display of a mobile terminal that may be brought in the cabin by the user.

FIG. 3 is a diagram for schematically illustrating examples of a charge source-specific travel distance image displayed on a display 20. Charge source-specific travel distance images 70A, 70B and 70C illustrated in FIG. 3 are in a form of a bar; however, the form thereof is arbitrary, including a gage with a sector form, a form of a bar graph, a form of a circle graph, and a simple form of a numeral number. In FIG. 3, (A) illustrates the charge source-specific travel distance image 70A in which a length L of the bar is constant, regardless of the travel distance, (B) illustrates the charge source-specific travel distance image 70B in which the length L of the bar varies according to the travel distance, and (C) illustrates the charge source-specific travel distance image 70C that includes only the travel distance based on the electric power from the photovoltaic power generating apparatus 400.

In FIG. 3, display portions indicated by "solar" in the charge source-specific travel distance images indicate a travel distance (referred to as "a solar travel distance" hereinafter) over which the travel is performed using the electric power from the photovoltaic power generating apparatus 400 (i.e., the electric power resulting from the photovoltaic power), display portions indicated by "regeneration" indicate a travel distance (referred to as "a regenerative travel distance" hereinafter) over which the travel is performed using the electric power resulting from the energy regenerated by the electric power generating motor 260, display portions indicated by "plug-in" indicate a travel distance (referred to as "a plug-in travel distance" hereinafter) over which the travel is performed using the electric power from the external electric power sources (i.e., the electric power resulting from the energy from the external electric power sources), and display portions indicated by "gasoline" indicate a travel distance (referred to as "a gasoline travel distance" hereinafter) over which the travel is performed by burning fossil fuels. It is noted that the notations "solar", "regeneration", etc., are arbitrary, and other notations such as "photovoltaic energy", "regenerated energy", etc., may be used. Further, the notation "gasoline" may be changed to "diesel", "gas", etc., according to types of the engine.

In the example illustrated in FIG. 3(A), the respective display portions of the solar travel distance, the regenerative travel distance, the plug-in travel distance and the gasoline travel distance are displayed with lengths according to the ratios thereof in the constant length L. For example, when the solar distance, the regenerative travel distance, the plug-in travel distance and the gasoline travel distance are 10%, 40%, 20% and 30%, respectively, the regenerative travel distance, the plug-in travel distance and the gasoline travel distance are displayed with lengths 0.1 L, 0.4 L, 0.2 L and 0.3 L, respectively.

The respective travel distances thus displayed are measured in any section. For example, a total travel distance from the time of shipment of the vehicle (i.e., the travel distance over the all sections), or a travel distance in a section specified by the user (i.e., the travel distance in a specific section) may be used. The travel distance in the specific section may be set automatically, such as a travel distance during the current single trip. Further, the respective travel distance displayed may be reset by the user.

A way of calculating the respective travel distances, that is to say, the solar distance, the regenerative travel distance, the plug-in travel distance and the gasoline travel distance may be arbitrary. For example, the gasoline travel distance may be calculated as a travel distance while the engine rpm is greater than 0 (i.e., during an ON state of the engine). It is noted that, if the drive motor 240, etc., are also used in combination for driving the vehicle during this period, this may be considered (the gasoline travel distance is corrected according to the travel distance during the combination, for example), or this may be neglected. On the other hand, the solar distance, the regenerative travel distance and the plug-in travel distance may be calculated based on a travel distance (referred to as "an electric travel distance" hereinafter) that is obtained by subtracting the gasoline travel distance in the target section from the travel distance of the vehicle in the target section. Specifically, by subtracting the gasoline travel distance in the target section from the travel distance of the vehicle in the target section, the electric travel distance in the target section can be obtained. The electric travel distance in the target section corresponds to a sum of the solar distance, the regenerative travel distance and the plug-in travel distance. Thus, the solar distance, the regenerative travel distance and the plug-in travel distance may be calculated by sharing the electric travel distance according to a predetermined rule. The predetermined rule may be arbitrary. For example, the predetermined rule may be based on ratios (charge source ratios) of charge amounts from the respective charge sources existing in a current SOC (State Of Charge) of the high-voltage battery 150, for example. For example, if the charge source ratios in the current SOC of the high-voltage battery 150 are such that the ratio of the electric power due to the photovoltaic energy is 20%, the ratio of the electric power due to the regenerative energy is 50% and the ratio of the electric power due to the external electric power sources is 30%, the electric travel distance may be shared with the ratios 20%, 50% and 30%, respectively, between the solar distance, the regenerative travel distance and the plug-in travel distance. In other words, if it is assumed that the electric travel distance is "L1", the solar distance, the regenerative travel distance and the plug-in travel distance are 0.2 L1, 0.5 L1 and 0.3 L1, respectively. In the following, such a way of sharing the electric travel distance is also referred to as "a first sharing way". Alternatively, the predetermined rule may be based on an assumption (decided rule) that the electric power from a predetermined energy source is used with higher priority. Preferably, the electric power from the predetermined energy source is the electric power resulting from nature energy, and the photovoltaic energy in this example. In this case, the electric travel distance may be calculated as the solar distance until the electric power resulting from the photovoltaic energy existing in the SOC of the high-voltage battery 150 is completely consumed, for example. In the following, such a way of sharing the electric travel distance is also referred to as "a second sharing way". It is noted that, after the electric power resulting from the photovoltaic energy existing in the SOC of the high-voltage battery 150 is completely consumed, the sharing with the second sharing way may be continued based on an assumption that the electric power from another predetermined energy source is used with the next higher priority, or the sharing with the first sharing way may be performed.

In the example illustrated in FIG. 3(B), the solar travel distance, the regenerative travel distance, the plug-in travel distance and the gasoline travel distance are displayed with lengths according to the magnitude thereof. In other words, in the example illustrated in FIG. 3(B), unlike the example illustrated in FIG. 3(A), the length L of the bar is not constant and thus becomes longer as the travel distance increases. In this way, the length L of the bar is not necessarily constant such that it increases according to the increase in the travel distance. However, a predetermined upper limit length may be set due to a constraint in the display 20.

In the example illustrated in FIG. 3(C), only the solar travel distance is displayed. The solar travel distance may be displayed with the length that becomes greater according to the increase in the travel distance, as the example illustrated in FIG. 3(B). In this way, the travel distance to be displayed is not necessarily the respective travel distances as illustrated in FIG. 3 (A) and FIG. 3(B). Thus, for example, only the solar distance, the regenerative travel distance and the plug-in travel distance may be displayed, or only the solar distance and the plug-in travel distance may be displayed.

In this way, according to the embodiment, in the case of a plurality of the charge sources being used, the travel distances are displayed on a charge source basis, which makes easier for the user to visually recognize the travel distances resulting from the respective charge sources. As a result of this, such effects can be predicted that ecology driving, etc., is promoted such that the user tries to extend the travel distance resulting from the desired charge source, for example.

Figure 4:
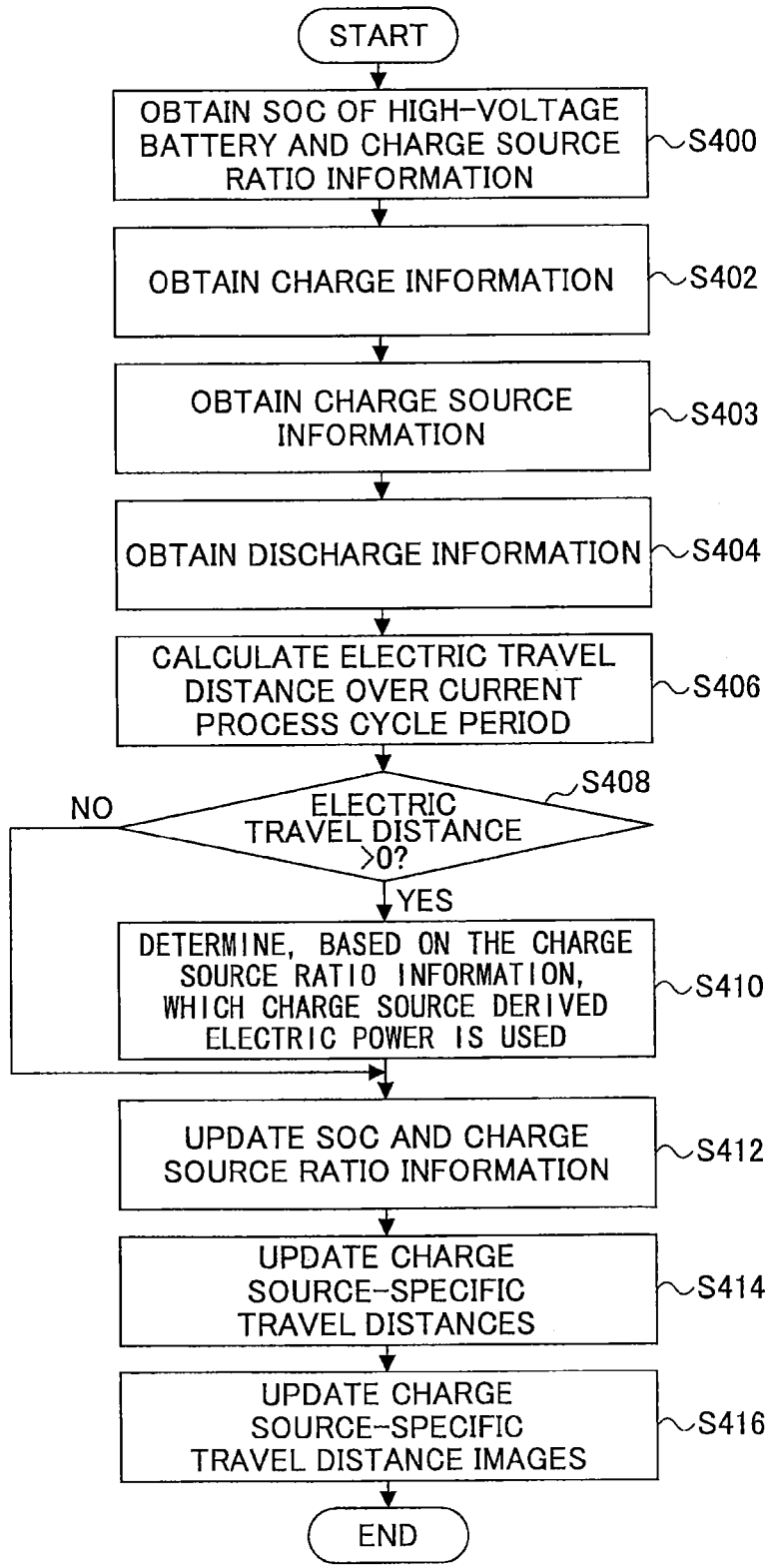
FIG. 4 is an example of a flowchart of a process executed by a processing device 10.

FIG. 4 is an example of a flowchart of a process executed by the processing device 10. The process routine illustrated in FIG. 4 is initiated when the ignition switch is turned on, and then is executed repeatedly at a predetermined cycle until the ignition switch is turned off.

In step S400, the current SOC of the high-voltage battery 150 and charge source ratio information are obtained. The charge source ratio information represents the charged electric power amount by the respective charge sources (energy sources) existing in the current SOC of the high-voltage battery 150. For example, the ratio of the electric power due to the photovoltaic power existing in the current SOC of the high-voltage battery 150 is 20%, the ratio of the electric power due to the regenerative energy is 50% and the ratio of the electric power due to the external electric power sources is 30%, the charge source ratio information represents these ratios (20%, 50% and 30%). It is noted that the current SOC of the high-voltage battery 150 and charge source ratio information may be updated even during the parked state of the vehicle if the plug-in charge is performed.

In step S402, charge information representing the charged amount of the high-voltage battery 150 during the current process period is obtained. For example, in the case of the process period being T [sec], the charge information representing the charged amount (the amount of the charged electric power) of the high-voltage battery 150 for the process cycle period T is obtained. The charge information may be obtained from an ECU that manages a charge/discharge state of the high-voltage battery 150, or may be generated and obtained by the processing device 10 itself. In the latter case, the processing device 10 may calculate the amount of the electric power charged to the high-voltage battery 150 based on an output value of a voltage sensor that detects the voltage across the high-voltage battery 150 and an output value of a current sensor that detects the current (charge current) flowing to the high-voltage battery 150, for example.

In step S403, charge source information related to the charge information obtained in step S402 is obtained. The charge source information represents from which charge source the electric power that is used to charge the high-voltage battery 150 is obtained. In other word, the charge source information represents the charge source that contributes to the charging of the high-voltage battery 150 in the process cycle period T. Here, the charge source information may represent from which charge source, among the photovoltaic energy, the regenerative energy and the external electric power source energy, the electric power that is used to charge the high-voltage battery 150 has resulted. It is noted that there may be a case where two or more charge sources are used. In such case, the charge source information may include information that identifies the two or more charge sources and information that identifies the charged amount by the respective charge sources. The charge source information may be obtained from an ECU that controls the charging from the respective charge sources, or may be generated and obtained by the processing device 10 itself.

In step S404, discharge information representing a discharged amount of the high-voltage battery 150 during the current process period is obtained. For example, in the case of the process period being T [sec], the discharge information representing the discharged amount (the amount of the discharged electric power, i.e., the consumed electric power) of the high-voltage battery 150 for the process period T is obtained. The discharge information may be obtained from an ECU that manages the charge/discharge state of the high-voltage battery 150, or may be generated and obtained by the processing device 10 itself. In the latter case, the processing device 10 may calculate the amount of the electric power discharged from the high-voltage battery 150 based on the output value of the voltage sensor that detects the voltage across the high-voltage battery 150 and the output value of the current sensor that detects the current (discharge current) flowing from the high-voltage battery 150, for example.

In step S406, the electric travel distance for the current process cycle period is calculated. The electric travel distance for the current process cycle period may be calculated by subtracting the gasoline travel distance over the current process cycle period from the travel distance over the current process cycle period, as described above. It is noted that travel distance itself may be calculated in an arbitrary way, and may be calculated based on an output signal of vehicle wheel speed sensors, for example.

In step S408, it is determined whether the electric travel distance calculated in step S406 is greater than 0. If it is determined that the electric travel distance calculated in step S406 is greater than 0, the process routine goes to step S410, otherwise (i.e., if the electric travel distance is 0) the process routine goes to step S412.

In step S410, it is determined, based on the charge source ratio information obtained in step S400, from which charge source, among the photovoltaic energy, the regenerate energy and the external electric power source energy, the electric power used for the travel for the current process cycle period has resulted. In other words, the electric travel distance over the current process cycle period is shared between the solar distance, the regenerative travel distance and the plug-in travel distance. The way of sharing the electric travel distance is arbitrary, and the first or second sharing way described above may be used, for example. For example, in the case of the first sharing way, the electric travel distance is shared between the solar distance, the regenerative travel distance and the plug-in travel distance according to the ratios based on the charge source ratio information obtained in step S400. In the case of the second sharing way, if it is determined, based on the charge source ratio information and the current SOC of the high-voltage battery 150 obtained in step S400, that the discharged amount of the high-voltage battery 150 for the process cycle period T (obtained in step S404) can be covered by the electric power resulting from the photovoltaic energy in the current SOC of the high-voltage battery 150, the overall electric travel distance is allocated to the solar travel distance. On the other hand, if the discharged amount of the high-voltage battery 150 for the process cycle period T cannot be covered by the electric power resulting from the photovoltaic energy in the current SOC of the high-voltage battery 150, a part of the electric travel distance that can be covered by the electric power resulting from the photovoltaic energy is allocated to the solar travel distance, and a remaining part of the electric travel distance is shared between the regenerative travel distance and the plug-in travel distance. The way of sharing the remaining part of the electric travel distance between the regenerative travel distance and the plug-in travel distance is arbitrary. The first or second sharing way described above may be used, for example. For example, in the case of the first sharing way, the remaining part of the electric travel distance is shared between the regenerative travel distance and the plug-in travel distance according to the ratios based on the charge source ratio information obtained in step S400. Further, in the case of the second sharing way (here, it is assumed that the electric power from the external electric power source energy is used with higher priority with respect to the electric power from the regenerated energy), if it is determined, based on the charge source ratio information and the current SOC of the high-voltage battery 150 obtained in step S400, that the electric power corresponding to the remaining part of the electric travel distance can be covered by the electric power resulting from the external electric power source energy, the remaining part of the electric travel is completely allocated to the plug-in travel distance. On the other hand, if it is determined that the electric power corresponding to the remaining part of the electric travel distance cannot be covered by the electric power resulting from the external electric power source energy, a part of the remaining part of the electric travel distance that can be covered by the electric power resulting from the external electric power source energy is allocated to the plug-in travel distance, and a remaining part thereof is allocated to the regenerative travel distance.

It is noted that, in step S410, the sharing is performed using the charge source ratio information obtained in step S400; however, the sharing may be performed using the charge information for the current process cycle period and the corresponding charge source information. In other words, if the charge is performed during the current process cycle period, the increase in the electric power (i.e., the change in the SOC of the high-voltage battery 150) due to that charge may be considered. In particular, in the case of using the second sharing way described above, the overall electric travel distance may be allocated to the solar travel distance even if the discharged amount of the high-voltage battery 150 for the process cycle period T cannot be covered by the electric power resulting from the photovoltaic energy in the current SOC of the high-voltage battery 150, if the discharged amount of the high-voltage battery 150 for the process cycle period T can be covered by the electric power resulting from the photovoltaic energy when the electric power resulting from the photovoltaic energy for the current process cycle period is added thereto.

In step S412, the current SOC of the high-voltage battery 150 and the charge source ratio information are updated based on the information obtained in step S402, step S403 and step S404 and the determination result of step S410 if the process in step S410 is performed. The current SOC of the high-voltage battery 150 may be updated based on a difference between the charged amount and the discharged amount for the current process cycle period.

In step S412, the charge source ratio information may be updated based on the charge source information obtained in step S403 if the determination result of step S408 is negative (i.e., if the electric travel distance is 0). Specifically, the charge source ratio information is updated by changing the charge source ratio information obtained in step S400 with the charge source information obtained in step S403. For example, it is assumed that the charge source ratio information and the current SOC of the high-voltage battery 150 obtained in step S400 are as follows.

The current SOC of the high-voltage battery 150=80% charge source ratio information=(the ratio of the electric power due to the photovoltaic power is 20%, the ratio of the electric power due to the regenerative energy is 50% and the ratio of the electric power due to the external electric power sources is 30%)

In this case, if the electric power amount corresponding to the overall capacity of the high-voltage battery 150 is "C0", the electric power due to the photovoltaic energy in the current SOC of the high-voltage battery 150 is equal to C0×0.8×0.2, the electric power due to the regenerative energy in the current SOC of the high-voltage battery 150 is equal to C0×0.8×0.5, and the electric power due to the external electric power source energy in the current SOC of the high-voltage battery 150 is equal to C0×0.8×0.3.

It is assumed that the charge source information obtained in step S403 is as follows.
The electric power due to the photovoltaic energy=Cs
The electric power due to the regenerative energy=Cr
The electric power due to the external electric power source energy=0
It is assumed that the discharge information obtained in step S404 is as follows.
Discharged amount=0
In this case, the update may be performed as follows. SOC of the high-voltage battery 150=100×(C0×0.8+Cs+Cr)/C0 (where there is an upper limit of 100)
The ratio of the electric power due to the photovoltaic energy in the charge source ratio information=(C0×0.8×0.2+Cs)/(C0×0.8+Cs+Cr)
The ratio of the electric power due to the regenerative energy in the charge source ratio information=(C0×0.8×0.5+Cr)/(C0×0.8+Cs+Cr)
The ratio of the electric power due to the external electric power source energy in the charge source ratio information=(C0×0.8×0.3)/(C0×0.8+Cs+Cr)

Further, In step S412, the charge source ratio information may be updated based on the charge source information obtained in step S403 and the determination result of step S410 if the determination result of step S408 is affirmative (i.e., if the electric travel distance is greater than 0). Specifically, the charge source ratio information is updated by changing the charge source ratio information obtained in step S400 with the charge source information obtained in step S403 and the determination result of step S410. For example, it is assumed that the charge source ratio information and the current SOC of the high-voltage battery 150 obtained in step S400 are as follows.

The current SOC of the high-voltage battery 150=80%
charge source ratio information=(the ratio of the electric power due to the photovoltaic power is 20%, the ratio of the electric power due to the regenerative energy is 50% and the ratio of the electric power due to the external electric power sources is 30%)

Similarly, if the electric power amount corresponding to the overall capacity of the high-voltage battery 150 is "C0", the electric power due to the photovoltaic energy in the current SOC of the high-voltage battery 150 is equal to C0×0.8×0.2, the electric power due to the regenerative energy in the current SOC of the high-voltage battery 150 is equal to C0×0.8×0.5, and the electric power due to the external electric power source energy in the current SOC of the high-voltage battery 150 is equal to C0×0.8×0.3.

It is assumed that the charge source information obtained in step S403 is as follows.
The electric power due to the photovoltaic energy=Cs
The electric power due to the regenerative energy=Cr
The electric power due to the external electric power source energy=0
It is assumed that the discharge information obtained in step S404 is as follows.
Discharged amount=Co
It is assumed that the determination result of step S410 is as follows.
Solar travel distance=ΔDs Regenerative travel distance=0
Plug-in travel distance=0

In this case, the update may be performed as follows. SOC of the high-voltage battery 150=100×(C0×0.8+Cs+Cr−Co)/C0 (where there is the upper limit of 100)

The ratio of the electric power due to the photovoltaic energy in the charge source ratio information=(C0×0.8×0.2+Cs−Co)/(C0×0.8+Cs+Cr−Co)

The ratio of the electric power due to the regenerative energy in the charge source ratio information=(C0×0.8×0.5+Cr)/(C0×0.8+Cs+Cr−Co)

The ratio of the electric power due to the external electric power source energy in the charge source ratio information=(C0×0.8×0.3)/(C0×0.8+Cs+Cr−Co)

In another example, it is assumed that the determination result of step S410 is as follows.

Solar travel distance=ΔDs
Regenerative travel distance=ΔDr
Plug-in travel distance=ΔDp
Where, ΔDe=ΔDs+ΔDr+ΔDp In this case, the update may be performed as follows. SOC of the high-voltage battery 150=100×(C0×0.8+Cs+Cr−Co)/C0 (where there is the upper limit of 100)

The ratio of the electric power due to the photovoltaic energy in the charge source ratio information=(C0×0.8×0.2+Cs−Co×ΔDs/ΔDe)/(C0×0.8+Cs+Cr−Co)

The ratio of the electric power due to the regenerative energy in the charge source ratio information=(C0×0.8×0.5+Cr−Co×ΔDr/ΔDe)/(C0×0.8+Cs+Cr−Co)

The ratio of the electric power due to the external electric power source energy in the charge source ratio information=(C0×0.8×0.3−Co×ΔDp/ΔDe)/(C0×0.8+Cs+Cr−Co)

It is noted that the calculation examples related to step S412 as described above are just examples, and for the sake of explanation, a simplified calculation way is used. In fact, for the sake of increasing the accuracy, etc., various changes or modifications may be added to the calculation way described above.

In step S414, the charge source-specific travel distances are updated. Specifically, the charge source-specific travel distances over the current process cycle period are added to the current charge source-specific travel distances that are cumulative totals at the previous process cycle. For example, it is assumed that the current charge source-specific travel distances that are cumulative totals at the previous process cycle are as follows.

Solar travel distance=Ds
Regenerative travel distance=Dr
Plug-in travel distance=Dp It is assumed that the charge source-specific travel distances over the current process cycle period are as follows.

Solar travel distance=ΔDs
Regenerative travel distance=ΔDr
Plug-in travel distance=ΔDp In this case, the charge source-specific travel distances (cumulative distances) may be updated as follows.

Solar travel distance=Ds+ΔDs
Regenerative travel distance=Dr+ΔDr
Plug-in travel distance=Dp+ΔDp In step S416, the charge source-specific travel distance images are updated based on the charge source-specific travel distances calculated in step S414. The charge source-specific travel distance images may be arbitrary as long as they indicate the charge source-specific travel distances calculated in step S414. The charge source-specific travel distance images may be as described above with reference to FIG. 3, for example. The process routine returns to step 400 after completing the process of step 416, and then the process routine of the next period is executed.

According to the on-vehicle travel distance output apparatus 1 of the embodiment, the following effect among others can be obtained.

According to the embodiment, as described above, in the configuration in which the high-voltage battery 150 is chargeable using the charge sources, the charge source-specific travel distances are displayed, which enables the user to understand the travel distances by the electric power obtained from the respective charge sources. As a result of this, such effects can be predicted that ecology driving, etc., is promoted such that the user tries to extend the travel distance obtained from the desired charge source, for example.

Further, in particular, if the electric travel distance is shared with the second sharing way described above, the solar travel distance is increased with higher priority, which can effectively increase the ecology thinking of the user. It is noted that, in fact, it is not possible to distinguish between the electric power resulting from the photovoltaic energy, the electric power resulting from the regenerative energy, etc., once the electric power has been charged to the high-voltage battery 150. Thus, basically, it can be said that the first sharing way is more in tune with what's going on. However, according to the second sharing way, the sharing is boldly performed based on the assumption (decided rule) that the electric power from the photovoltaic energy is used first, which effectively causes the user to have satisfaction that the photovoltaic energy that is nature energy is effectively utilized, and thus effectively increases the ecology thinking of the user.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention. Further, all or part of the components of the embodiments described above can be combined.

For example, the charge source-specific travel distance images 70A, 70B and 70C illustrated in FIG. 3 may include figures of the respective travel distances or scales.

Further, according to the embodiment, the photovoltaic power generating apparatus 400 is provided based on the premise that the electric power is generated using the photovoltaic energy. In this case, the regenerative travel distance and/or the plug-in travel distance may be displayed.

Further, according to the embodiment, the regenerative energy is energy (electric power) obtained by the electric power generating motor 260 performing the regenerative brake operation; however, in the case of the drive motor 240 also performing the regenerative brake operation, the regenerative energy may include energy (electric power) obtained by the drive motor 240 performing the regenerative brake operation.

Figure 5:
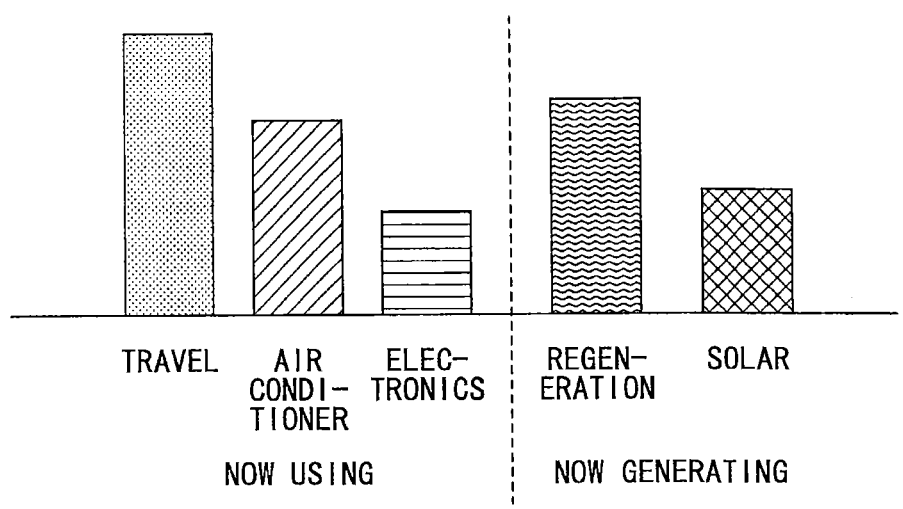
FIG. 5 is a diagram for illustrating an example of a display that represents a current charge/discharge state.

FIG. 5 is a diagram for illustrating an example of a display that represents the current charge/discharge state. In the example illustrated in FIG. 5, a left side with respect to a dotted line represents for what the electric power is currently being used. In this case, there are three usages, that is to say, travel, an air conditioner, electronics (other electronics); and the heights of bar graphs indicate the amounts of the electric power used for the respective purposes. Further, in the example illustrated in FIG. 5, a right side with respect to the dotted line represents what kinds of the electric power are currently being generated. In this case, there are two kinds, that is to say, a regeneration (regenerative energy) and solar (photovoltaic energy), and the height of bar graphs indicate the amounts of the electric power being generated. In this way, for what the electric power is currently being used and what kinds of the electric power are currently being generated may be displayed visually and in real time.

DESCRIPTION OF REFERENCE SYMBOLS

1 on-vehicle travel distance output apparatus
10 processing device
20 display device
70A, 70B, 70C charge source-specific travel distance image
100 motor drive system
120 low-voltage battery
150 high-voltage battery
200 DC-DC converter
210 inverter
220 inverter
240 drive motor
260 electric power generating motor
270 inlet
300 charge cable
320 plug
330 connector
340 battery charging apparatus
400 photovoltaic power generating apparatus

The invention claimed is:

1. An on-vehicle travel distance output apparatus for a vehicle, the vehicle including: a battery and a travel motor that generate, based on electric power of the battery, a drive force for the travel of the vehicle, wherein the battery is chargeable based on electric power from a first charge source as well as electric power from a second charge source, the on-vehicle travel distance output apparatus comprising:
a processing device that calculates a first travel distance of the vehicle over which the vehicle travels based on the electric power of the battery obtained from the first charge source and a second travel distance of the vehicle over which the vehicle travels based on the electric power of the battery obtained from the second charge source to output the calculated first and second travel distances.

2. The on-vehicle travel distance output apparatus of claim 1, wherein the processing device calculates the first and second travel distances assuming that, with respect to the charged electric power of the battery, the electric power of the battery obtained from the first charge source is used prior to the electric power of the battery obtained from the second charge source.

3. The on-vehicle travel distance output apparatus of claim 1, wherein the processing device calculates the first and second travel distances based on a ratio between the electric power of the battery obtained from the first charge source and the electric power of the battery obtained from the second charge source, of the charged electric power of the battery.

4. The on-vehicle travel distance output apparatus of claim 1, wherein the first charge source is a photovoltaic power generating apparatus that performs charging based on photovoltaic power.

5. The on-vehicle travel distance output apparatus of claim 1, wherein the second charge source includes two or more charge sources, and the second travel distance is calculated on a charge source basis.

6. The on-vehicle travel distance output apparatus of claim 1, further comprising a display that displays the first and second distances.

7. The on-vehicle travel distance output apparatus of claim 1, wherein the processing device simultaneously outputs the calculated first travel distance and the calculated second travel distance.

* * * * *